United States Patent
Dong et al.

(10) Patent No.: US 10,996,368 B2
(45) Date of Patent: May 4, 2021

(54) PRESELECTING INITIAL GUESSES FOR MULTI-STEP INVERSION USING ELECTROMAGNETIC MEASUREMENTS

(71) Applicant: Halliburton Energy Services, Inc., Houston, TX (US)

(72) Inventors: Weixin Dong, Sugar Land, TX (US); Hsu-Hsiang Wu, Sugar Land, TX (US); Li Pan, Singapore (SG)

(73) Assignee: Halliburton Energy Services, Inc., Houston, TX (US)

( * ) Notice: Subject to any disclaimer, the term of this patent is extended or adjusted under 35 U.S.C. 154(b) by 2 days.

(21) Appl. No.: 16/615,382

(22) PCT Filed: Dec. 28, 2018

(86) PCT No.: PCT/US2018/067820
§ 371 (c)(1),
(2) Date: Nov. 20, 2019

(87) PCT Pub. No.: WO2020/139364
PCT Pub. Date: Jul. 2, 2020

(65) Prior Publication Data
US 2021/0055447 A1   Feb. 25, 2021

(51) Int. Cl.
*G01V 3/30* (2006.01)
*G01V 3/38* (2006.01)
*G01V 3/28* (2006.01)

(52) U.S. Cl.
CPC .................. *G01V 3/30* (2013.01); *G01V 3/28* (2013.01); *G01V 3/38* (2013.01)

(58) Field of Classification Search
CPC .............. G01V 3/38; G01V 3/28; G01V 3/12
See application file for complete search history.

(56) References Cited

U.S. PATENT DOCUMENTS 6,344,746 B1   2/2002   Chunduru et al.
2010/0332198 A1   12/2010   Wahrmund et al.
(Continued)

FOREIGN PATENT DOCUMENTS

WO   2018144029   8/2018

OTHER PUBLICATIONS

ISRWO International Search Report and Written Opinion for PCT/US2018/067820 dated Sep. 24, 2019.

*Primary Examiner* — Alvaro E Fortich
(74) *Attorney, Agent, or Firm* — Benjamin Ford; C. Tumey Law Group PLLC (57) ABSTRACT

A system and method for electromagnetic measurements. The system may comprise an electromagnetic transmitter, wherein the electromagnetic transmitter is an antenna and is operable to transmit a low frequency electromagnetic field into a formation or a high frequency electromagnetic field into the formation. The system may further comprise an electromagnetic receiver, wherein the electromagnetic receiver is an antenna and is operable to record the high frequency electromagnetic field or the low frequency electromagnetic field. The method may comprise transmitting a high frequency electromagnetic field, recording a high frequency electromagnetic field, transmitting a low frequency electromagnetic field, recording a low frequency electromagnetic field, performing a shallow inversion on the low frequency electromagnetic field and the high frequency electromagnetic field to form a formation resistivity model, and running the deep inversion with the random initial guesses that have the misfit.

20 Claims, 5 Drawing Sheets

(56) References Cited

U.S. PATENT DOCUMENTS

| | | |
|---|---|---|
| 2015/0330190 A1 | 11/2015 | Wu et al. |
| 2016/0245952 A1* | 8/2016 | Dupuis .................... G01V 3/08 |
| 2017/0306701 A1* | 10/2017 | Wu .......................... E21B 7/04 |
| 2017/0306741 A1* | 10/2017 | Martakov ................ G01V 3/30 |
| 2018/0283168 A1 | 10/2018 | Ranjan et al. |

* cited by examiner

PRESELECTING INITIAL GUESSES FOR MULTI-STEP INVERSION USING ELECTROMAGNETIC MEASUREMENTS

BACKGROUND

Wellbores drilled into subterranean formations may enable recovery of desirable fluids (e.g., hydrocarbons) using a number of different techniques. A logging tool may be employed in subterranean operations to determine wellbore and/or formation properties. Formation evaluation further from a wellbore is a critical step in reservoir characterization and monitoring. Logging tools typically measure the "near-field", or in the proximity of the wellbore. Logging tools are evolving to measure the "far-field", or large distances from the wellbore.

Logging tools may obtain geophysical and/or logging measurements for formation evaluation and monitoring. The geophysical and/or logging measurements may be altered through mathematical schemes, such as an inversion scheme, to determine formation characteristics. Currently, inversions schemes utilized are time consuming to perform and require vast amounts of data. There is a need to perform inversion based methods in a near and/or real time manner during a drilling, logging, and/or production operation. Additionally, inversion schemes are generally specific to a single downhole tool that operates in a specific manner, which increases operation cost across the industry. A single inversion scheme that requires less time to perform, requires less data, and is able to work with data from any number of downhole tools would increase the productivity, reduce operation cost, and/or allow for drilling decisions to be made in hours and not in days and/or weeks.

BRIEF DESCRIPTION OF THE DRAWINGS

These drawings illustrate certain aspects of some examples of the present disclosure, and should not be used to limit or define the disclosure.

DETAILED DESCRIPTION

The present application is directed to subterranean operations and, more particularly, to methods and systems for well logging that use electromagnetic resistivity logging tools. This disclosure aims to provide better inversion for an ultra-deep electromagnetic resistivity logging tools with both shallow measurements and deep measurements. Shallow measurements can be inverted to get a finer formation picture around the wellbore, but its depth-of-investigation (DOI) is small. Deep measurements are able to estimate the formation picture further away from the wellbore, but with lower resolution. A method of preselecting initials for multi-step inversion is proposed here which aims to keep the large DOI from the deep measurements and meanwhile preserve fine resolution around the wellbore using shallow measurements with higher confidence.

Disclosed below is a method of preselecting initials for multi-step inversion using shallow measurements from an ultra-deep electromagnetic resistivity logging tools. Shallow inversion results are evaluated and the results in high confident area are kept and used to create the initial guess pool for the next step inversion. All the initials are evaluated and those with best misfit are selected for the deep inversion which inverts the formation properties only outside of the confident area by adding deep measurements. The shallow inversion results are preserved to keep its fine resolution and high confident.

Figure 1:
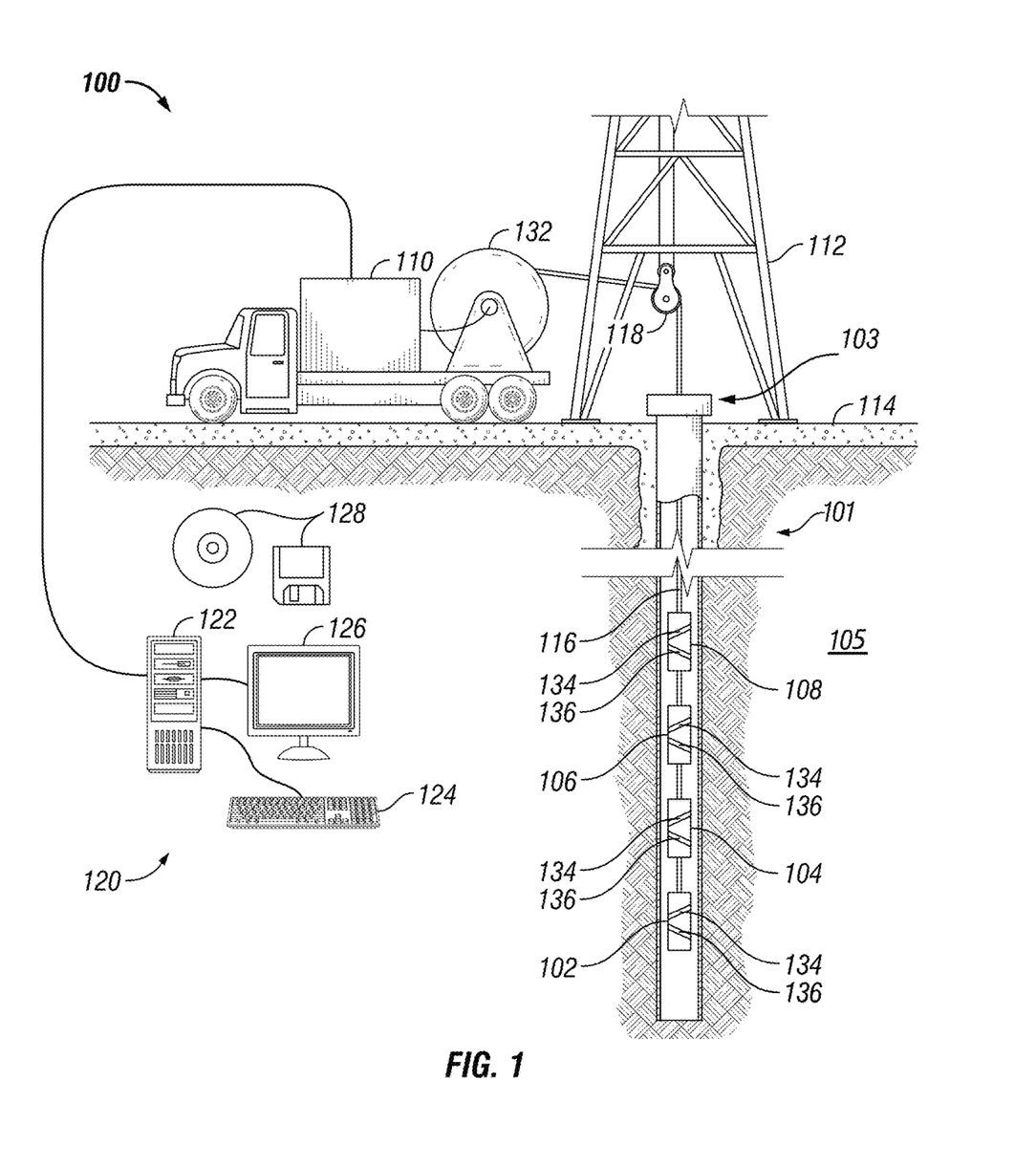
FIG. 1 illustrate an example of an electromagnetic well measurement system.

FIG. 1 illustrates a cross-sectional view of an electromagnetic well measurement system 100 which may be disposed in a wellbore 101. As illustrated, wellbore 101 may extend from a wellhead 103 into a subterranean formation 105 from surface 114. Generally, wellbore 101 may include horizontal, vertical, slanted, curved, and other types of wellbore geometries and orientations. Wellbore 101 may be cased or uncased. In examples, wellbore 101 may include a metallic material. By way of example, the metallic member may be a casing, liner, tubing, or other elongated steel tubular disposed in wellbore 101.

As illustrated, wellbore 101 may extend through subterranean formation 105. As illustrated in FIG. 1, wellbore 101 may extending generally vertically into the subterranean formation 105, however wellbore 101 may extend at an angle through subterranean formation 105, such as horizontal and slanted wellbores. For example, although FIG. 1 illustrates a vertical or low inclination angle well, high inclination angle or horizontal placement of the well and equipment may be possible. It should further be noted that while FIG. 1 generally depicts a land-based operation, those skilled in the art may recognize that the principles described herein are equally applicable to subsea operations that employ floating or sea-based platforms and rigs, without departing from the scope of the disclosure.

As illustrated, electromagnetic well measurement system 100 may include an electromagnetic induction tools may be used in a number of downhole induction tools operations, such as measuring-while-drilling (MWD), logging-while-drilling (LWD), wireline logging, and permanent monitoring operations. In examples, without limitation, tubulars may be disposed within the drill collar on a bottom hole assembly, a wireline tool mandrel, and/or permanently installed production casing. For brevity, the metallic tubular may be referred to as a downhole tool below. The electromagnetic antenna in the electromagnetic induction tool may be a magnetometer and/or an induction coil, which may reside on the downhole tool and/or outside. In examples, an electromagnetic source may be an electromagnetic antenna, which may be energized to produce an electromagnetic field. Where used, either the electromagnetic antenna and/or electromagnetic source may reside on the bottom hole assembly and/or outside, even on the surface.

Electromagnetic antennae may record voltages from electromagnetic fields induced by the electromagnetic source. Depending on details of the electromagnetic antenna's design and the size of the computation domain (e.g. mandrel and wellbore lengths) included in an inversion computation, it may take hours to a matter of days to fully compute recorded data from electromagnetic antenna(s). Without limitation, operations that may compute electric and/or magnetic fields may determine the distance and inclination of target well in ranging applications, bed resistivity and distances to bed boundaries in resistivity application, as well as distance to oil-water interface and resistivity change in waterflood monitoring application. Computation of the inversion may comprise a list of unknown parameters and the accuracy of these parameters may depend on the accuracy of a forward model. Forward models may comprise full-wave methods which may capture a mandrel (i.e., the supporting structured of the downhole tool) and the wellbore effect accurately.

Electromagnetic well measurement system may include a first downhole tool 102, a second downhole tool 104, a third downhole tool 106, and/or a fourth downhole tool 108 disposed on a conveyance, which may be lowered into wellbore 101. In examples, each downhole tool may be separated by about 1 foot (0.3 meter) to about 100 feet (30 meters), about twenty feet (6.096 meters) to about 200 feet (61 meters), or about 50 feet (15 meters) to about 100 (30 meters). It should be noted that electromagnetic well measurement system 100 may include first downhole tool 102. In additional examples, there may be a plurality of downhole tools, such as first downhole tool 102. As illustrated, first downhole tool 102, second downhole tool 104, third downhole tool 106, and/or fourth downhole tool 108 may attach to a vehicle 110. In examples, it should be noted that first downhole tool 102, second downhole tool 104, third downhole tool 106, and/or fourth downhole tool 108 may not be attached to a vehicle 110. First downhole tool 102, second downhole tool 104, third downhole tool 106, and/or fourth downhole tool 108 may be supported by rig 112 at surface 114. First downhole tool 102, second downhole tool 104, third downhole tool 106, and/or fourth downhole tool 108 may be tethered to vehicle 110 through conveyance 116. Conveyance 116 may be disposed around one or more sheave wheels 118 to vehicle 110. Conveyance 116 may include any suitable means for providing mechanical conveyance for first downhole tool 102, second downhole tool 104, third downhole tool 106, and/or fourth downhole tool 108, including, but not limited to, wireline, slickline, coiled tubing, pipe, drill pipe, downhole tractor, or the like. In some embodiments, conveyance 116 may provide mechanical suspension, as well as electrical connectivity, for first downhole tool 102, second downhole tool 104, third downhole tool 106, and/or fourth downhole tool 108. Conveyance 116 may include, in some instances, a plurality of electrical conductors extending from vehicle 110. Conveyance 116 may include an inner core of several electrical conductors covered by an insulating wrap. An inner and outer steel armor sheath may be wrapped in a helix in opposite directions around the conductors. The electrical conductors may be used for communicating power and telemetry between vehicle 110 and first downhole tool 102, second downhole tool 104, third downhole tool 106, and/or fourth downhole tool 108. Information from first downhole tool 102, second downhole tool 104, third downhole tool 106, and/or fourth downhole tool 108 may be gathered and/or processed by information handling system 120. For example, signals recorded by first downhole tool 102, second downhole tool 104, third downhole tool 106, and/or fourth downhole tool 108 may be stored on memory and then processed by first downhole tool 102, second downhole tool 104, third downhole tool 106, and/or fourth downhole tool 108. The processing may be performed real-time during data acquisition or after recovery of first downhole tool 102, second downhole tool 104, third downhole tool 106, and/or fourth downhole tool 108. Processing may alternatively occur downhole or may occur both downhole and at surface. In some embodiments, signals recorded by first downhole tool 102, second downhole tool 104, third downhole tool 106, and/or fourth downhole tool 108 may be conducted to information handling system 120 by way of conveyance 116. Information handling system 120 may process the signals, and the information contained therein may be displayed for an operator to observe and stored for future processing and reference. Information handling system 120 may also contain an apparatus for supplying control signals and power to first downhole tool 102, second downhole tool 104, third downhole tool 106, and/or fourth downhole tool 108.

Systems and methods of the present disclosure may be implemented, at least in part, with information handling system 120. Information handling system 120 may include any instrumentality or aggregate of instrumentalities operable to compute, estimate, classify, process, transmit, receive, retrieve, originate, switch, store, display, manifest, detect, record, reproduce, handle, or utilize any form of information, intelligence, or data for business, scientific, control, or other purposes. For example, an information handling system 120 may be a personal computer, a network storage device, or any other suitable device and may vary in size, shape, performance, functionality, and price. Information handling system 120 may include random access memory (RAM), one or more processing resources such as a central processing unit (CPU) 122 or hardware or software control logic, ROM, and/or other types of nonvolatile memory. Additional components of the information handling system 120 may include one or more disk drives, one or more network ports for communication with external devices as well as an input device 124 (e.g., keyboard, mouse, etc.) and output devices, such as a video display 126. Information handling system 120 may also include one or more buses operable to transmit communications between the various hardware components.

Alternatively, systems and methods of the present disclosure may be implemented, at least in part, with non-transitory computer-readable media 128. Non-transitory computer-readable media 128 may include any instrumentality or aggregation of instrumentalities that may retain data and/or instructions for a period of time. Non-transitory computer-readable media 128 may include, for example, storage media such as a direct access storage device (e.g., a hard disk drive or floppy disk drive), a sequential access storage device (e.g., a tape disk drive), compact disk, CD-ROM, DVD, RAM, ROM, electrically erasable programmable read-only memory (EEPROM), and/or flash memory; as well as communications media such wires, optical fibers, microwaves, radio waves, and other electromagnetic and/or optical carriers; and/or any combination of the foregoing.

In examples, rig 112 includes a load cell (not shown) which may determine the amount of pull on conveyance 116 at the surface of wellbore 101. Information handling system 120 may include a safety valve which controls the hydraulic pressure that drives drum 132 on vehicle 110 which may reels up and/or release conveyance 116 which may move first downhole tool 102, second downhole tool 104, third downhole tool 106, and/or fourth downhole tool 108 up and/or down wellbore 101. The safety valve may be adjusted to a pressure such that drum 132 may only impart a small amount of tension to conveyance 116 over and above the tension necessary to retrieve conveyance 116 and/or first downhole tool 102, second downhole tool 104, third downhole tool 106, and/or fourth downhole tool 108 from wellbore 101. The safety valve is typically set a few hundred pounds above the amount of desired safe pull on conveyance 116 such that once that limit is exceeded; further pull on conveyance 116 may be prevented.

In examples, first downhole tool 102, second downhole tool 104, third downhole tool 106, and/or fourth downhole tool 108 may include an electromagnetic transmitter 134 and/or an electromagnetic receiver 136. It should be noted each downhole tool may comprise a plurality of electromagnetic transmitters 134 and/or a plurality of electromagnetic receivers 136. The plurality of electromagnetic transmitters 134 and the plurality of electromagnetic receiver 136 may be disposed along a longitudinal axis of the electromagnetic induction tool 122. As disclosed, the concepts that are described herein are valid for any type of electromagnetic transmitters 134 and electromagnetic receiver 136. As an example, wire antenna, toroidal antenna and/or azimuthal button electrodes, electromagnetic transmitter coils, and/or electromagnetic receiver coils may also be used in the place of the electromagnetic transmitters 134 and/or electromagnetic receiver 136. In some examples, electromagnetic receiver 136 may comprise an electromagnetic transmitters, an electromagnetic receiver, or a transceiver. Without limitation, electromagnetic transmitters 134 and/or electromagnetic receiver 136 may be disposed on and/or adjacent to a gap sub. In examples, there may be more than one gap sub in which electromagnetic transmitters 134 and/or electromagnetic receiver 136 may be disposed on and/or adjacent to.

Additionally, electromagnetic transmitter 134 may operate and function to broadcast an electromagnetic field. In examples, electromagnetic transmitter 134 ma broadcast a low frequency electromagnetic field and/or a high frequency electromagnetic field. A low frequency electromagnetic field, wherein the low frequency electromagnetic field may range from about 1 KHz to about 250 KHz. Electromagnetic transmitter 134 may also broadcast a high frequency electromagnetic field, which may range from about 250 KHz to about 2 MHz. Electromagnetic transmitter 134 may broadcast the high frequency electromagnetic field and the low frequency electromagnetic field on any number of frequencies along any number of channels sequentially and/or simultaneously on the same antenna and/or multiple antennas. In examples, first downhole tool 102, second downhole tool 104, third downhole tool 106, and/or fourth downhole tool 108 may operate with additional equipment (not illustrated) on surface 114 and/or disposed in a separate electromagnetic well measurement system (not illustrated) to record measurements and/or values from formation 138. During operations, electromagnetic transmitter 134 may broadcast the high frequency electromagnetic field or the low frequency electromagnetic field from first downhole tool 102, second downhole tool 104, third downhole tool 106, and/or fourth downhole tool 108. Electromagnetic transmitter 134 may be connected to information handling system 120, which may further control the function and/or operation of electromagnetic transmitter 134. Additionally, electromagnetic receiver 136 may measure and/or record electromagnetic fields broadcasted from electromagnetic transmitter 134. Electromagnetic receiver 136 may transfer recorded information to information handling system 120. Information handling system 120 may control the operation of electromagnetic receiver 136. For example, the broadcasted electromagnetic field from electromagnetic transmitter 134 may be altered (i.e., in phase and attenuation, and/or the like) by formation 138, which may be sensed, measured, and/or recorded by electromagnetic receiver 136. It should be noted that electromagnetic transmitter 134 and electromagnetic receiver 136 may be the same antenna, coil, toroid, and/or the like. The recorded signal may be transferred to information handling system 120 for further processing.

In examples, there may be any suitable number of electromagnetic transmitters 134 and/or electromagnetic receivers 136, which may be controlled by information handling system 120. Information and/or measurements may be processed further by information handling system 120 to determine properties of wellbore 101, fluids, and/or formation 138.

Figure 2:
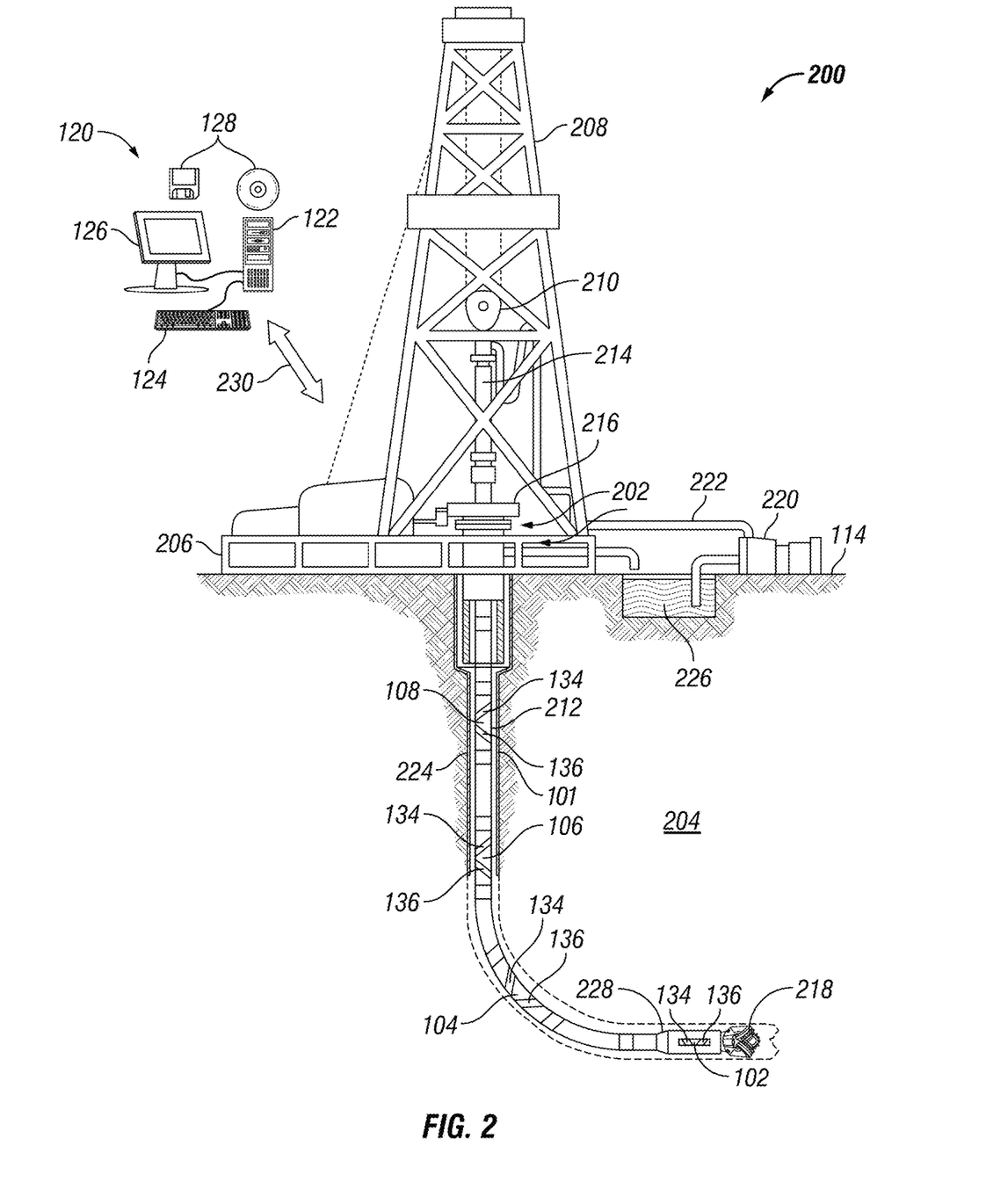
FIG. 2 illustrates another example of an electromagnetic well measurement system.

FIG. 2 illustrates an example in which first downhole tool 102, second downhole tool 104, third downhole tool 106, and/or fourth downhole tool 108 may be disposed in wellbore 101 through a drilling system 200. As illustrated, drilling system 200 may include a drilling platform 206 may support a derrick 208 having a traveling block 210 for raising and lowering drill string 212. Drill string 212 may include, but is not limited to, drill pipe and coiled tubing, as generally known to those skilled in the art. A kelly 214 may support drill string 212 as it may be lowered through a rotary table 216. A drill bit 218 may be attached to the distal end of drill string 212 and may be driven either by a downhole motor and/or via rotation of drill string 212 from surface 114. Without limitation, drill bit 218 may include, roller cone bits, PDC bits, natural diamond bits, any hole openers, reamers, coring bits, and the like. As drill bit 218 rotates, it may create and extend wellbore 101 that penetrates various subterranean formations 204. A pump 220 may circulate drilling fluid through a feed pipe 222 to kelly 214, downhole through interior of drill string 212, through orifices in drill bit 218, back to surface 114 via annulus 224 surrounding drill string 212, and into a retention pit 226.

With continued reference to FIG. 2, drill string 212 may begin at wellhead 202 and may traverse wellbore 101. Drill bit 218 may be attached to a distal end of drill string 212 and may be driven, for example, either by a downhole motor and/or via rotation of drill string 212 from surface 114. Drill bit 218 may be a part of bottom hole assembly 228 at distal end of drill string 212. Bottom hole assembly 228 may further include first downhole tool 102. First downhole tool 102 may be disposed on the outside and/or within bottom hole assembly 228. It should be noted that second downhole tool 104, third downhole tool 106, and/or fourth downhole tool 108 may be disposed on drill string 212. Second downhole tool 104, third downhole tool 106, and/or fourth downhole tool 108 may be disposed on the outside and/or within drill string 212. First downhole tool 102, second downhole tool 104, third downhole tool 106, and/or fourth downhole tool 108 may include an electromagnetic transmitter 134 and/or an electromagnetic receiver 136. It should be noted that first downhole tool 102, second downhole tool 104, third downhole tool 106, and/or fourth downhole tool 108 may include a plurality of electromagnetic transmitters 134 and/or electromagnetic receivers 136. Electromagnetic transmitters 134 and/or electromagnetic receivers 136 may operate and/or function as described above. As will be appreciated by those of ordinary skill in the art, first downhole tool 102, second downhole tool 104, third downhole tool 106, and/or fourth downhole tool 108 may be a measurement-while drilling (MWD) or logging-while-drilling (LWD) system.

Without limitation, first downhole tool 102, second downhole tool 104, third downhole tool 106, and/or fourth downhole tool 108, electromagnetic transmitters 134, and/or electromagnetic receiver 136 may be connected to and/or controlled by information handling system 120, which may be disposed on surface 114. Without limitation, information handling system 120 may be disposed down hole in first downhole tool 102, second downhole tool 104, third downhole tool 106, and/or fourth downhole tool 108. Processing of information recorded may occur down hole and/or on surface 114. Processing occurring downhole may be transmitted to surface 114 to be recorded, observed, and/or further analyzed. Additionally, information recorded on information handling system 120 that may be disposed down hole may be stored until first downhole tool 102, second downhole tool 104, third downhole tool 106, and/or fourth downhole tool 108 may be brought to surface 114. In examples, information handling system 120 may communicate with first downhole tool 102, second downhole tool 104, third downhole tool 106, and/or fourth downhole tool 108 through a communication line (not illustrated) disposed in (or on) drill string 212. In examples, wireless communication may be used to transmit information back and forth between information handling system 120 and first downhole tool 102, second downhole tool 104, third downhole tool 106, and/or fourth downhole tool 108. Information handling system 120 may transmit information to first downhole tool 102, second downhole tool 104, third downhole tool 106, and/or fourth downhole tool 108 and may receive as well as process information recorded by first downhole tool 102, second downhole tool 104, third downhole tool 106, and/or fourth downhole tool 108. In examples, a downhole information handling system (not illustrated) may include, without limitation, a microprocessor or other suitable circuitry, for estimating, receiving and processing signals from first downhole tool 102, second downhole tool 104, third downhole tool 106, and/or fourth downhole tool 108. Downhole information handling system (not illustrated) may further include additional components, such as memory, input/output devices, interfaces, and the like. In examples, while not illustrated, first downhole tool 102, second downhole tool 104, third downhole tool 106, and/or fourth downhole tool 108 may include one or more additional components, such as analog-to-digital converter, filter and amplifier, among others, that may be used to process the measurements of first downhole tool 102, second downhole tool 104, third downhole tool 106, and/or fourth downhole tool 108 before they may be transmitted to surface 114. Alternatively, raw measurements from first downhole tool 102, second downhole tool 104, third downhole tool 106, and/or fourth downhole tool 108 may be transmitted to surface 114.

Any suitable technique may be used for transmitting signals from first downhole tool 102, second downhole tool 104, third downhole tool 106, and/or fourth downhole tool 108 to surface 114, including, but not limited to, wired pipe telemetry, mud-pulse telemetry, acoustic telemetry, and electromagnetic telemetry. While not illustrated, first downhole tool 102, second downhole tool 104, third downhole tool 106, and/or fourth downhole tool 108 may include a telemetry subassembly that may transmit telemetry data to surface 114. Without limitation, an electromagnetic source in the telemetry subassembly may be operable to generate pressure pulses in the drilling fluid that propagate along the fluid stream to surface 114. At surface 114, pressure transducers (not shown) may convert the pressure signal into electrical signals for a digitizer (not illustrated). The digitizer may supply a digital form of the telemetry signals to information handling system 120 via a communication link 230, which may be a wired or wireless link. The telemetry data may be analyzed and processed by information handling system 120.

As illustrated, communication link 230 (which may be wired or wireless, for example) may be provided that may transmit data from first downhole tool 102, second downhole tool 104, third downhole tool 106, and/or fourth downhole tool 108 to an information handling system 120 at surface 114. Information handling system 120 may include a central processing unit 122, a video display 126, an input device 124 (e.g., keyboard, mouse, etc.), and/or non-transitory computer-readable media 128 (e.g., optical disks, magnetic disks) that may store code representative of the methods described herein. In addition to, or in place of processing at surface 114, processing may occur downhole.

First downhole tool 102, second downhole tool 104, third downhole tool 106, and/or fourth downhole tool 108 may include an electromagnetic transmitter 134 and/or an electromagnetic receiver 136. In examples, first downhole tool 102, second downhole tool 104, third downhole tool 106, and/or fourth downhole tool 108 may operate with additional equipment (not illustrated) on surface 114 and/or disposed in a separate electromagnetic well measurement system (not illustrated) to record measurements and/or values from subterranean formation 204. During operations, electromagnetic transmitter 134 may broadcast an electromagnetic field from first downhole tool 102, second downhole tool 104, third downhole tool 106, and/or fourth downhole tool 108. Electromagnetic transmitter 134 may be connected to information handling system 120, which may further control the function and/or operation of electromagnetic transmitter 134. Additionally, electromagnetic receiver 136 may sense, measure, and/or record electromagnetic fields broadcasted from electromagnetic transmitter 134. Electromagnetic receiver 136 may transfer recorded information to information handling system 120. Information handling system 120 may control the operation of electromagnetic receiver 136. For example, the broadcasted electromagnetic field from electromagnetic transmitter 134 may be altered (i.e., in phase and attenuation, and/or the like) by subterranean formation 204. The altered electromagnetic field may be recorded by electromagnetic receiver 136 and may be transferred to information handling system 120 for further processing. In examples, there may be any suitable number of electromagnetic transmitters 134 and/or electromagnetic receivers 136, which may be controlled by information handling system 120. Information and/or measurements may be processed further by information handling system 120 to determine properties of wellbore 101, fluids, and/or subterranean formation 204.

During electromagnetic logging operations, deep electromagnetic measurements, which may be found using low frequency electromagnetic fields, may be fed into an inversion together with shallow measurements, which may be found using high frequency electromagnetic fields. The inversion may produce a formation resistivity model. Without limitations, deep electromagnetic measurements may be measurements that may be able to measure formation properties that are more than 100 feet away and shallow electromagnetic measurements may be measurements that are sensitive to formation properties within a range of about 100 feet (30 meters).

In examples, the inversion may be a general inversion which uses minimization algorithms to find a formation model that may fit the measurements. The inversion assumes a 1D layered model within a designated area, identified as a variable "X," above and below the wellbore. The number "X" is the depth of investigation which is proportional to tool spacing. In examples, "X" may vary from several feet to several hundred feet. For deep measurements a high frequency signal may be used with a depth of investigation that may be more about 100 feet (30 meters) to about 500 feet (152 meters). It should be noted that long spacing between an electromagnetic transmitter 134 and an electromagnetic receiver 136 (e.g., referring to FIG. 1) may be from about 20 feet (6 meters) to about 200 feet (61 meters). However, for shallow measurements a low frequency signal may be used with a depth of investigation that may be shorter from about 1 foot (0.3 meter) to about 100 feet (30 meters). It should be not that short spacing between an electromagnetic transmitter 134 and an electromagnetic receiver 136 (e.g., referring to FIG. 1) may be about 1 foot (0.3 meter) to about 20 feet (6 meters)

In a second example, a multi-step inversion may be implemented tp preserve high resolution near wellbore 101 (e.g., referring to FIGS. 1 and 2) while being able to detect the formation boundaries at a distance. This method may use a multi-step inversion. For example, in the multi-step inversion the shallow measurement may be inverted and the results may be fed into a second inversion using deep measurements to find a formation resistivity model. This inversion scheme may be updated when an operator selects initials guesses based on the previous inversion results to improve quality of the formation resistivity model. These initial guesses may play an important role in controlling the multi-step inversion quality.

Figure 3:
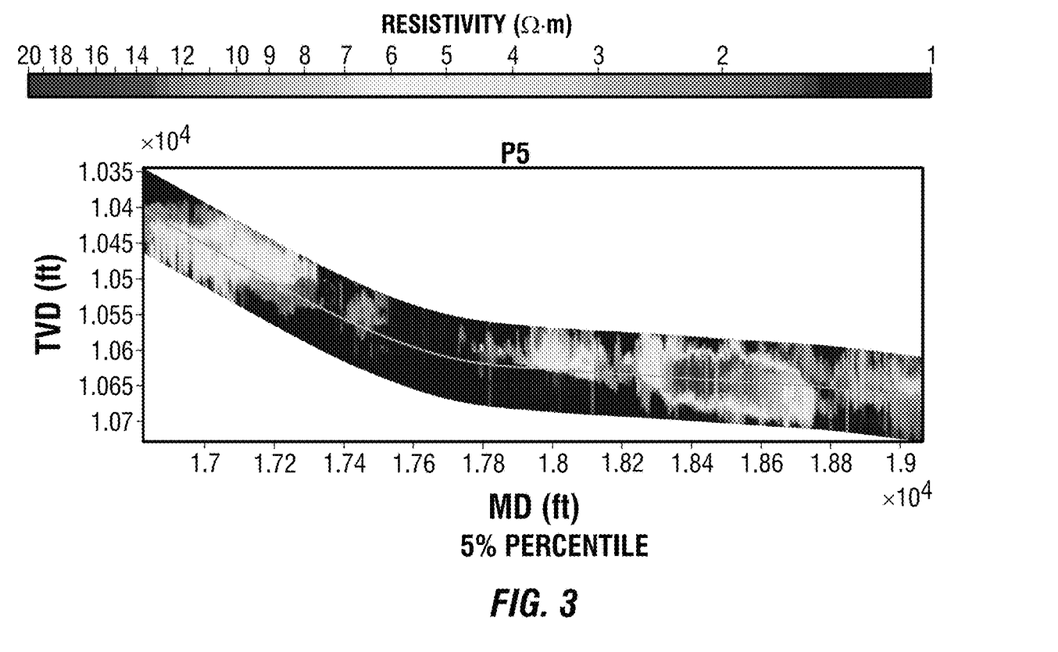
FIG. 3 illustrates a graph of 5% percentile of all the possible inversion results that fit measurements within a chosen threshold.
Figure 4:
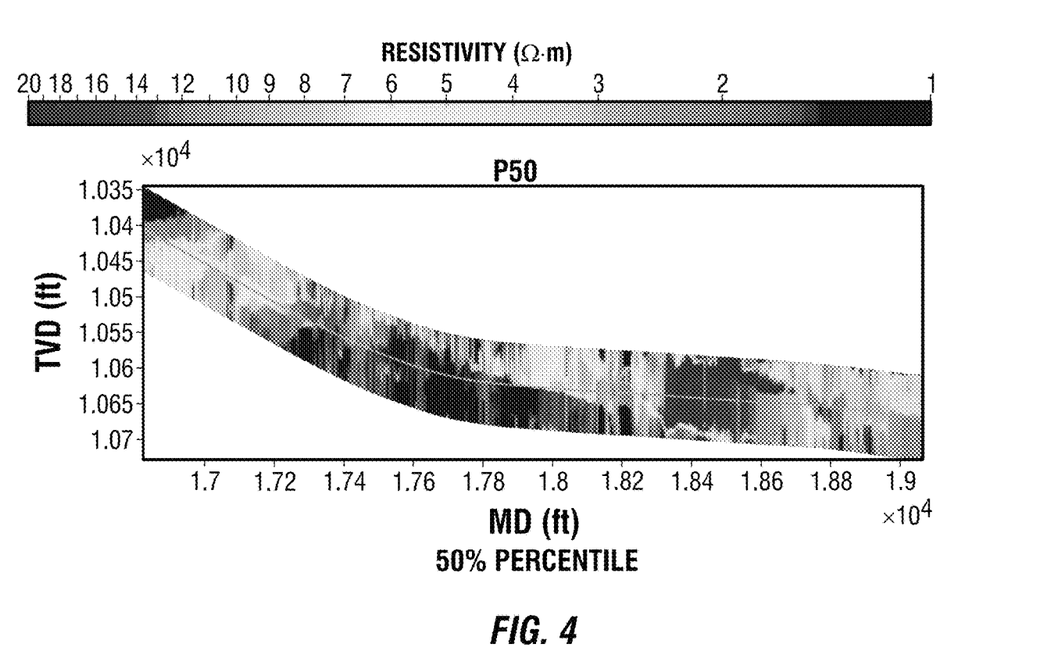
FIG. 4 illustrates a graph of 50% percentile of all the possible inversion results that fit measurements within a chosen threshold.
Figure 5:
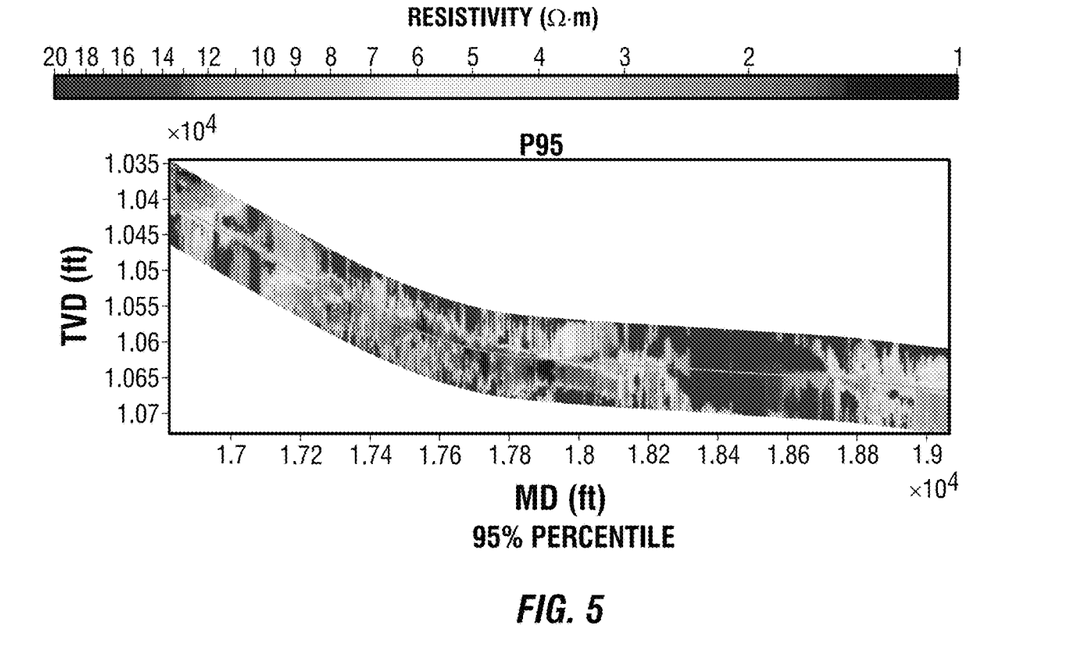
FIG. 5 illustrates a graph of 95% percentile of all the possible inversion results that fit measurements within a chosen threshold.

The visualization of inverted formation models, as shown in FIGS. 3-5, show three different percentiles of shallow inversion results with 60 feet (18 meters) of DOI. FIGS. 3-5 illustrates the percentile of all possible inverted formation models in which the predicted tool responses fit the input measurements within a certain threshold. It should be noted that an operator may visually identify the responses that fit the input measurements within a selected threshold. FIG. 3 illustrates an inversion curtain section at 5% Rh (horizontal resistivity) model. FIG. 4 illustrates an inversion curtain section at 50% Rh model. FIG. 5 illustrates an inversion curtain section at 95% Rh model. A curtain section in a 5% model may be defined as when only 5% of the input measurements (i.e., deep electromagnetic measurements and shallow measurements) are within an operator selected threshold. In examples, the threshold may be the smallest total mismatch between predicted tool responses and measurements. This may be defined as an error rate. The error rate may be chosen by the operator and may range from about 1 percent to about 15 percent. There may be 5% models where Rh is smaller and 95% models where Rh is larger. Hence, 50% percentile is considered as the median model and 95% percentile is the model on the larger Rh border.

High confident areas may be located where at least three formation resistivity models (i.e., FIGS. 3-5) have similar Rh values. Each formation resistivity model may have individual thresholds. For example, a first formation resistivity model may have a first threshold, a second formation resistivity model may have a second threshold, and a third formation resistivity model may have a third threshold. The selected threshold may range from 1% to 99%. In examples, high confident areas may be where the Rh difference between the formation resistivity models have an error rate that may be within several Ohm/m. The error rate may be chosen by the operator and may range from about 1 percent to about 15 percent. Low confidence locates at where the three figures have different Rh values and the formation properties in these areas will be inverted in a next step inversion, wherein the next step inversion uses a larger DOI.

Figure 6:
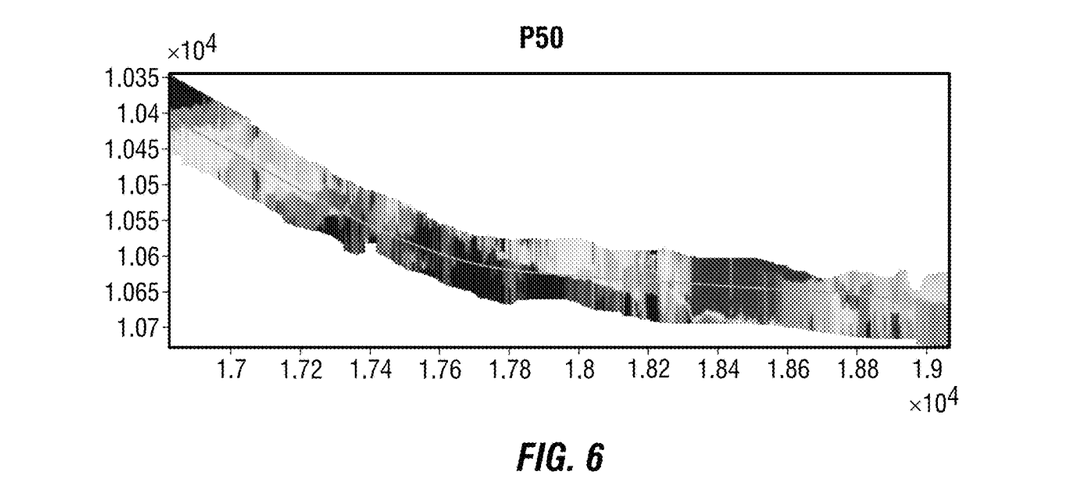
FIG. 6 illustrates a graph of truncated shallow inversion results with high confident areas.

FIG. 6 shows the high confident area of an average of results. These results may be kept and not inverted in the next step inversion. More formation layers may be added above and below the results at random position with random layer resistivity, which may create initial model for a next step inversion. This initial model may be evaluated against measurements that are recorded, and initial models that may have the best misfit, wherein the best misfit is the smallest total mismatch between predicted tool responses and measurements, may be fed into the next step inversion. The next step inversion may have large DOI and may invert the formation properties outside of the high confident by adding deep measurements.

Figure 7:
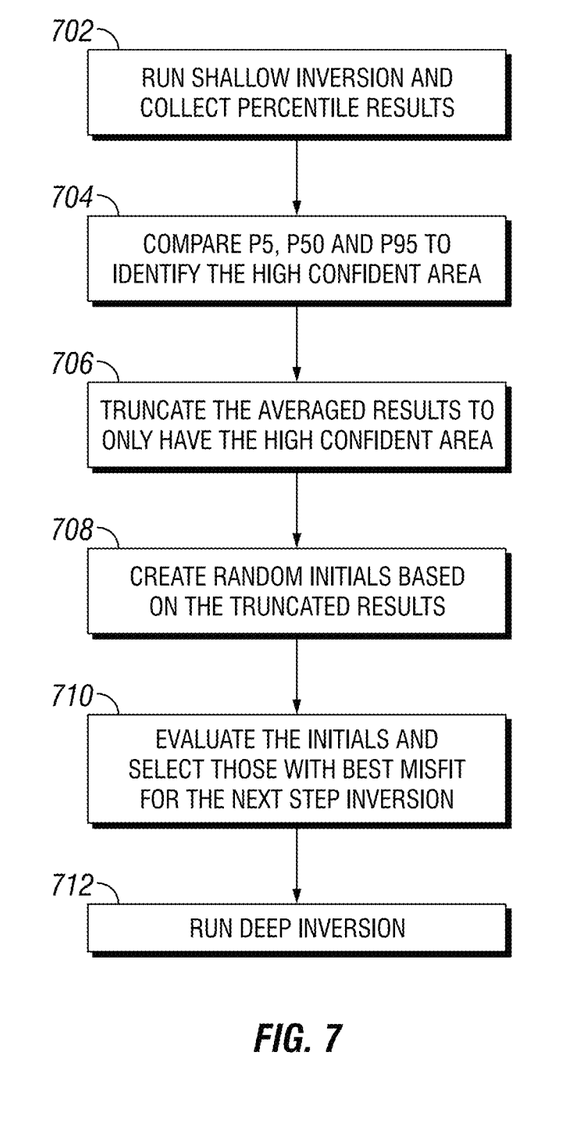
FIG. 7 illustrates a workflow 700 for preselecting initial guesses for a multi-step inversion.

FIG. 7 illustrates workflow 700 for preselecting initial guesses for a multi-step inversion. In step 702, an operator may run a shallow inversion and collect percentile results. As discussed above, percentile results may be statistical models, such a horizontal resistivity, that from all the possible inversion results a percentile fit measurements recorded by electromagnetic receiver 136 within a certain threshold. A threshold may be an error rate chosen by an operator. For example, the threshold may be an error rate between about 1 percent to about 15 percent. The results from step 702 may be evaluated in step 704. In step 704 an operator may compare a 5% percentile, a 10% percentile, and a 95% percentile to identify a high confident area. Once the high confident area has been determine, the information may pass to step 706. In step 706 the operator may truncate the averaged results. In examples, the averaged results may be the final inversion results from summarizing all the possible formation models that fit the input measurements. The truncation may be done automatically by the algorithm to only have the high confident area. In step 708, the operator may create random initial guesses based on the truncated results. Without limitation, the random initial guess may be created within the formation property ranges as predefined default values and/or adjusted using an operator's knowledge on the formation. In step 710, the operator may evaluate the random initials guesses and select those with best misfit for the next step inversion. In examples, "misfit" is the difference between the electromagnetic well measurement system 100 responses based on the initial formation model and the deep electromagnetic measurement and/or shallow measurement. Additionally, "best" may be defined as the initial formation model that has the smallest "misfit" among all initial models, where the "best" may be within a threshold set by the operator. In step 712 the operator may run a deep inversion. In examples, a deep inversion may be defined as inverting measurements from longer spacing to invert for formations more than 100 feet (30 meters) away. In examples, the deep inversion may be populated with the initials that were selected from step 710.

The methods described above are improvements over current technology. Specifically, a shallower formation structure may be preserved and only the formation properties beyond this area are inverted in the next step inversion using deeper measurements. The methods listed above may improve the accuracy of distance-to-bed-boundary inversions by doing inversion step by step, which may help in drilling operations as well as production operations. Additionally, the methods may preserve formation structure of fine resolution derived from shallow measurements while keeping the large DOI from deep measurements. Methods and systems may further provide additional service base on existing tools hardware and improve the log interpretation with higher confidence for formation evaluations, including formation resistivity determination (Rh and Rv), formation dip inversion, formation distance-to-bed-boundary inversion.

Determining higher confidence for formation evaluations may allow an operator to select well operations that may assist in increasing production in a wellbore. For example, well operation may include, but is not limited to, chemical treatments, fracking, gas injections, thermal injections, fire flooding, polymer flooding, and/or the like. These well operations may help in the effective and efficient removal of desirable fluids from a formation.

This method and system may include any of the various features of the compositions, methods, and system disclosed herein, including one or more of the following statements.

Statement 1. A electromagnetic well measurement system may comprise an electromagnetic transmitter. The electromagnetic transmitter may be an antenna and may be operable to transmit a low frequency electromagnetic field of about 1 KHz to about 250 KHz for about 100 feet to about 500 feet into a formation or a high frequency electromagnetic field of about 250 KHz to about 2 MHZ into the formation at a depth of about 1 foot to about 100 feet. The system may further comprise an electromagnetic receiver. The electromagnetic receiver may be an antenna and may be operable to record the high frequency electromagnetic field or the low frequency electromagnetic field. The system may further comprise an information handling system. The information handling system may be configured to produce a deep electromagnetic measurement from the measured low frequency electromagnetic field and a shallow measurement from the high frequency electromagnetic field, perform an inversion with the deep electromagnetic measurements and the shallow measurement to find a formation resistivity model, set a first threshold for the formation resistivity model and visually identify the deep electromagnetic measurements and the shallow measurement that are within the threshold, set a second threshold for the formation resistivity model and visually identify the deep electromagnetic measurements and the shallow measurement that are within the second threshold, set a third threshold for the formation resistivity model and visually identify the deep electromagnetic measurements and the shallow measurement that are within the third threshold. The information handling system may further be configured to identify at least one area on the formation model that has the same resistivity measurements from the first threshold, the second threshold, and the third threshold, truncate the at least one area, create a random initial guesses of a formation property rang, compare the random initial guesses that have a misfit for a deep inversion, and run the deep inversion with the random initial guesses that have the misfit.

Statement 2 the system of statement 1, further comprising a downhole tool, wherein the electromagnetic transmitter and the electromagnetic receiver are disposed on the downhole tool.

Statement 3 the system of statements 1 or 2, wherein the electromagnetic transmitter is disposed about 100 feet to about 500 feet from the electromagnetic receiver.

Statement 4 the system of statements 1 to 3, wherein electromagnetic transmitter is disposed about 1 foot to about 100 feet from the electromagnetic receiver.

Statement 5 the system of statements 1 to 4, further comprising a first downhole tool and a second downhole tool.

Statement 6 the system of statement 5, wherein the second downhole tool each has an electromagnetic transmitter and an electromagnetic receiver.

Statement 7 the system of statements 5 to 6, further comprising a third downhole tool and a fourth downhole tool.

Statement 8 the system of statement 5 to 7, wherein third downhole tool and a fourth downhole tool each have an electromagnetic transmitter and an electromagnetic receiver.

Statement 9 the system of statements 1 to 8, further comprising a bottom hole assembly and a drill bit.

Statement 10 the system of statement 9, the electromagnetic transmitter and the electromagnetic receiver are disposed on the bottom hole assembly.

Statement 11. A method for preselecting initial guesses for multi-step inversion from electromagnetic measurements may comprise disposing an electromagnetic well measurement system into a wellbore. The electromagnetic well measurement system may comprise an electromagnetic transmitter, wherein the electromagnetic transmitter is an antenna, and electromagnetic receiver, wherein the electromagnetic receiver is an antenna. The method may further comprise transmitting a high frequency electromagnetic field from the electromagnetic transmitter into a formation, wherein the high frequency electromagnetic field has a frequency of about 250 KHz to about 2 MHZ at a depth in the formation of about 1 foot to about 100 feet, recording a high frequency electromagnetic field with electromagnetic receiver, transmitting a low frequency electromagnetic field from the electromagnetic transmitter into the formation, wherein the low frequency electromagnetic field has a frequency of about 1 KHz to about 250 KHz for a depth into the formation of about 100 feet to about 500 feet, and recording a low frequency electromagnetic field with electromagnetic receiver, wherein the reflected low frequency electromagnetic field is recorded as a measurement of the formation. The method may further comprise performing a shallow inversion on the low frequency electromagnetic field and the high frequency electromagnetic field to form a formation resistivity model, setting a first threshold for the formation resistivity model and visually identifying the deep electromagnetic measurements and the shallow measurement that are within the threshold, setting a second threshold for the formation resistivity model and visually identifying the deep electromagnetic measurements and the shallow measurement that are within the second threshold, setting a third threshold for the formation resistivity model and visually identifying the deep electromagnetic measurements and the shallow measurement that are within the third threshold, and identifying at least one area on the formation model that have the same resistivity measurements from the first threshold, the second threshold, and the third threshold. The method may further comprise truncating the at least one area, creating a random initial guesses of a formation property range, comparing the random initial guesses that have a misfit for a deep inversion, and running the deep inversion with the random initial guesses that have the misfit.

Statement 12. The method of statement 11, wherein the electromagnetic well measurement system further comprises a downhole tool, wherein the electromagnetic transmitter and the electromagnetic receiver are disposed on the downhole tool.

Statement 13. The method of statements 11 or 12, wherein the electromagnetic transmitter is disposed about 100 feet to about 500 feet from the electromagnetic receiver.

Statement 14. The method of statements 11 to 13, wherein electromagnetic transmitter is disposed about 1 foot to about 100 feet from the electromagnetic receiver.

Statement 15. The method of statements 11 to 14, further comprising a first downhole tool and a second downhole tool.

Statement 16. The method of statement 15, wherein the second downhole tool has an electromagnetic transmitter and an electromagnetic receiver.

Statement 17. The method of statements 15 to 16, further comprising a third downhole tool and a fourth downhole tool.

Statement 18. The method of statements 15 to 17, wherein third downhole tool and a fourth downhole tool each have an electromagnetic transmitter and an electromagnetic receiver.

Statement 19. The method of statements 11 to 18, further comprising a bottom hole assembly and a drill bit.

Statement 20. The method of statement 11 to 19, the electromagnetic transmitter and the electromagnetic receiver are disposed on the bottom hole assembly.

The preceding description provides various examples of the systems and methods of use disclosed herein which may contain different method steps and alternative combinations of components. It should be understood that, although individual examples may be discussed herein, the present disclosure covers all combinations of the disclosed examples, including, without limitation, the different component combinations, method step combinations, and properties of the system. It should be understood that the compositions and methods are described in terms of "comprising," "containing," or "including" various components or steps, the compositions and methods can also "consist essentially of" or "consist of" the various components and steps. Moreover, the indefinite articles "a" or "an," as used in the claims, are defined herein to mean one or more than one of the element that it introduces.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

Therefore, the present examples are well adapted to attain the ends and advantages mentioned as well as those that are inherent therein. The particular examples disclosed above are illustrative only, and may be modified and practiced in different but equivalent manners apparent to those skilled in the art having the benefit of the teachings herein. Although individual examples are discussed, the disclosure covers all combinations of all of the examples. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative examples disclosed above may be altered or modified and all such variations are considered within the scope and spirit of those examples. If there is any conflict in the usages of a word or term in this specification and one or more patent(s) or other documents that may be incorporated herein by reference, the definitions that are consistent with this specification should be adopted.

What is claimed is:

1. A electromagnetic well measurement system comprising:
    an electromagnetic transmitter, wherein the electromagnetic transmitter 1s an antenna and is operable to transmit a low frequency electromagnetic field of 1 KHz (Kilohertz) to 250 KHz for 100 feet to 500 feet into a formation or a high frequency electromagnetic field of 250 KHz to 2 MHZ (Megahertz) into the formation at a depth of 1 foot to 100 feet;
    an electromagnetic receiver, wherein the electromagnetic receiver is an antenna and is operable to record the high frequency electromagnetic field or the low frequency electromagnetic field; and
    an information handling system configured to:
        produce a deep electromagnetic measurement from the measured low frequency electromagnetic field and a shallow measurement from the high frequency electromagnetic field;
        perform an inversion with the deep electromagnetic measurements and the shallow measurement to find a formation resistivity model;
        set a first threshold for the formation resistivity model and visually identify the deep electromagnetic measurements and the shallow measurement that are within the threshold;
        set a second threshold for the formation resistivity model and visually identify the deep electromagnetic measurements and the shallow measurement that are within the second threshold;
        set a third threshold for the formation resistivity model and visually identify the deep electromagnetic measurements and the shallow measurement that are within the third threshold;
        identify at least one area on the formation model that has the same resistivity measurements from the first threshold, the second threshold, and the third threshold;
        truncate the at least one area;
        create a random initial guesses of a formation property range;
        compare the random initial guesses that have a misfit for a deep inversion; and
        run the deep inversion with the random initial guesses that have the misfit.

2. The electromagnetic well measurement system of claim 1, further comprising a downhole tool, wherein the electromagnetic transmitter and the electromagnetic receiver are disposed on the downhole tool.

3. The electromagnetic well measurement system of claim 2, wherein the electromagnetic transmitter is disposed 100 feet to 500 feet from the electromagnetic receiver.

4. The electromagnetic well measurement system of claim 2, wherein electromagnetic transmitter is disposed 1 foot to 100 feet from the electromagnetic receiver.

5. The electromagnetic well measurement system of claim 1, further comprising a first downhole tool and a second downhole tool.

6. The electromagnetic well measurement system of claim 5, wherein the second downhole tool each has an electromagnetic transmitter and an electromagnetic receiver.

7. The electromagnetic well measurement system of claim 6, further comprising a third downhole tool and a fourth downhole tool.

8. The electromagnetic well measurement system of claim 7, wherein third downhole tool and a fourth downhole tool each have an electromagnetic transmitter and an electromagnetic receiver.

9. The electromagnetic well measurement system of claim 1, further comprising a bottom hole assembly and a drill bit.

10. The electromagnetic well measurement system of claim 9, wherein the electromagnetic transmitter and the electromagnetic receiver are disposed on the bottom hole assembly.

11. A method for preselecting initial guesses for multistep inversion from electromagnetic measurements:
disposing an electromagnetic well measurement system into a wellbore, wherein the electromagnetic well measurement system comprises:
an electromagnetic transmitter, wherein the electromagnetic transmitter is an antenna;
an electromagnetic receiver, wherein the electromagnetic receiver is an antenna;
transmitting a high frequency electromagnetic field from the electromagnetic transmitter into a formation, wherein the high frequency electromagnetic field has a frequency of KHz (Kilohertz) to 2 MHZ (Megahertz) at a depth in the formation of 1 foot to 100 feet;
recording a high frequency electromagnetic field with electromagnetic receiver; transmitting a low frequency electromagnetic field from the electromagnetic transmitter into the formation, wherein the low frequency electromagnetic field has a frequency of 1 KHz to 250 KHz for a depth into the formation of 100 feet to 500 feet;
recording a low frequency electromagnetic field with electromagnetic receiver, wherein the reflected low frequency electromagnetic field is recorded as a measurement of the formation;
performing a shallow inversion on the low frequency electromagnetic field and the high frequency electromagnetic field to form a formation resistivity model;
setting a first threshold for the formation resistivity model and visually identifying the deep electromagnetic measurements and the shallow measurement that are within the threshold;
setting a second threshold for the formation resistivity model and visually identifying the deep electromagnetic measurements and the shallow measurement that are within the second threshold;
setting a third threshold for the formation resistivity model and visually identifying the deep electromagnetic measurements and the shallow measurement that are within the third threshold;
identifying at least one area on the formation model that have the same resistivity measurements from the first threshold, the second threshold, and the third threshold;
truncating the at least one area;
creating a random initial guesses of a formation property range;
comparing the random initial guesses that have a misfit for a deep inversion; and
running the deep inversion with the random initial guesses that have the misfit.

12. The method of claim 11, wherein the electromagnetic well measurement system further comprises a downhole tool, wherein the electromagnetic transmitter and the electromagnetic receiver are disposed on the downhole tool.

13. The method of claim 12, wherein the electromagnetic transmitter is disposed about feet to 500 feet from the electromagnetic receiver.

14. The method of claim 12, wherein electromagnetic transmitter is disposed 1 foot to 100 feet from the electromagnetic receiver.

15. The method of claim 11, further comprising a first downhole tool and a second downhole tool.

16. The method of claim 15, wherein the second downhole tool has an electromagnetic transmitter and an electromagnetic receiver.

17. The method of claim 16, further comprising a third downhole tool and a fourth downhole tool.

18. The method of claim 17, wherein third downhole tool and a fourth downhole tool each have an electromagnetic transmitter and an electromagnetic receiver.

19. The method of claim 11, further comprising a bottom hole assembly and a drill bit.

20. The method of claim 19, wherein the electromagnetic transmitter and the electromagnetic receiver are disposed on the bottom hole assembly.

* * * * *

UNITED STATES PATENT AND TRADEMARK OFFICE
CERTIFICATE OF CORRECTION

PATENT NO. : 10,996,368 B2  
APPLICATION NO. : 16/615382  
DATED : May 4, 2021  
INVENTOR(S) : Weixin Dong, Hsu-Hsiang Wu and Li Pan Page 1 of 1

It is certified that error appears in the above-identified patent and that said Letters Patent is hereby corrected as shown below:

In the Claims

Column 14 Line 14, Claim 1 from "1s" to --is--.  
Column 15 Line 28, Claim 11 from "has a frequency of KHz" to --has a frequency of 250 KHz--.  
Column 16 Line 25, Claim 13 from "is disposed about feet to 500 feet" to --is disposed 100 feet to 500 feet--.

Signed and Sealed this  
Seventeenth Day of August, 2021

Drew Hirshfeld  
*Performing the Functions and Duties of the*  
*Under Secretary of Commerce for Intellectual Property and*  
*Director of the United States Patent and Trademark Office*